April 6, 1965
L. H. FITZMAYER ETAL
3,177,335
THERMOSTAT PROBE FOR COMBINED UHF AND INFRARED
ENERGY COOKING OVEN
Filed June 19, 1963
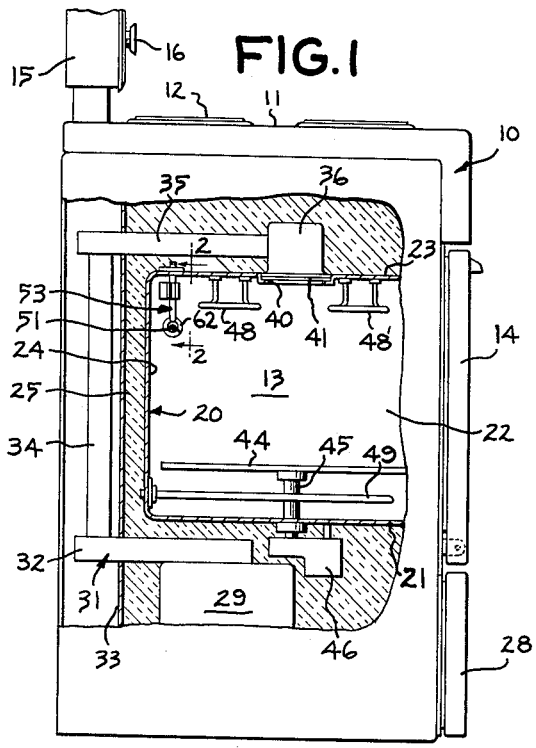
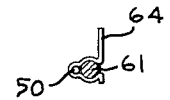
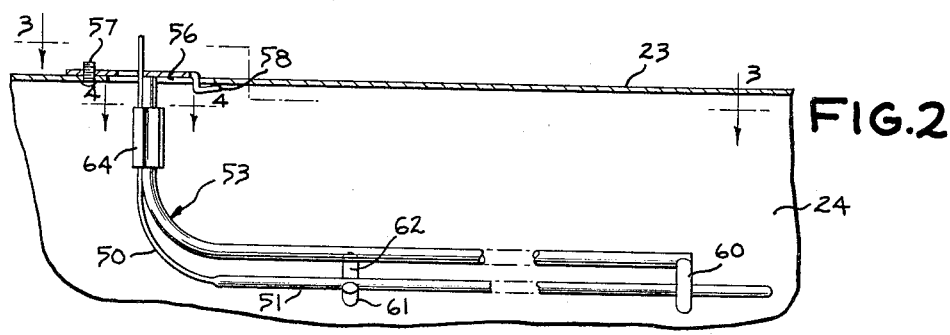
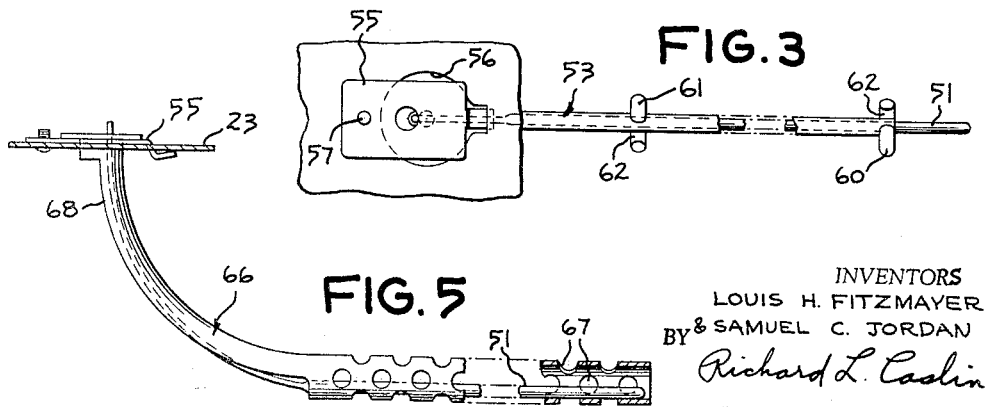
INVENTORS
LOUIS H. FITZMAYER
& SAMUEL C. JORDAN
BY Richard L. Caslin
THEIR ATTORNEY United States Patent Office 3,177,335
Patented Apr. 6, 1965

3,177,335
THERMOSTAT PROBE FOR COMBINED UHF AND INFRARED ENERGY COOKING OVEN
Louis H. Fitzmayer, Louisville, and Samuel C. Jordan, Lyndon, Ky., assignors to General Electric Company, a corporation of New York
Filed June 19, 1963, Ser. No. 288,943
7 Claims. (Cl. 219—10.55)

The present invention relates to a cooking apparatus and particularly to a combined UHF and infrared energy cooking oven with a thermostatic control system for the source of infrared energy.

It is well known in the cooking art that many types of food may be cooked rapidly using ultra-high frequency electromagnetic wave energy in either one of the two approved frequency bands of approximately 915 mc. and 2450 mc.; such an oven it sometimes referred to as an electronic oven. This type of wave energy does not heat up the metal portions of the oven cavity, but it directly penetrates the food to be cooked which is a semiconducting or dielectric material. Unfortunately, this wave energy will not brown the exterior of the food so that dough products and meat have an unusual appearance which psychologically affects the consumers' acceptance of this means of rapid cooking. For many years a consumer's needs required both a UHF oven and a separate conventional oven, either electric or gas, so that the food would be cooked in successive steps in both ovens.

Much work has also been directed toward a combined UHF and infrared energy oven so that the food may be cooked with the wave energy and simultaneously browned with the infrared energy. In such a combined oven, food may be cooked in one of three manners, either conventionally with the infrared energy, rapidly with the UHF energy, and lastly with a combination of the UHF energy and the infrared energy. The amount of cooking performed by the UHF energy is controlled by an oven timer which governs the length of the exposure of the food to the UHF energy. This length of time is obtained empirically by home economists working in test kitchens, and their findings are recorded in recipe books that are furnished to the consumer with the purchase of the oven.

However, the infrared heating means which is the type used in conventional ovens must be governed by a thermostatic control system such as a hydraulic thermostat having a capillary tube that leads into the oven cavity and terminates in a temperature sensing probe or bulb that is positioned adjacent the infrared heating means. It is necessary to insure that the thermostat probe will be insensitive to the UHF energy so as to obtain correct temperature readings and protect the probe from damage due to overheating or electrical arcing.

The principal object of the present invention is to provide a temperature sensing probe for a combined UHF and infrared energy cooking oven, where the probe is sensitive only to the infrared energy and is insensitive to the UHF energy so as not to resonate over the frequency range of the oven.

A further object of the present invention is to provide a thermostat probe of the class described with support means for rendering the probe insensitive to UHF energy by preventing the formation of a series resonant circuit by the judicious spacing of grounding points between the support and probe.

A further object of the present invention is to provide a thermostat probe of the class described with a support means having a series of spaced grounding means that cooperates with the probe to form a low impedance eccentric transmission line that prevents the probe from creating a resonant loop and being sensitive to the UHF energy.

The present invention, in accordance with one form thereof, embodies walls defining an oven cavity where one wall of the cavity includes a door for gaining access thereto. The oven is supplied with two sources of heat energy for cooking food placed therein. First, there is a generator of ultra-high frequency electromagnetic wave energy that is provided with a transmission means and a feeding means for guiding and coupling the wave energy into the oven cavity. Secondly, the oven is provided with an infrared heating means for raising the temperature of the oven air and walls for heating the food with convection currents and radiant energy. A thermostatic control system is provided for the infrared heating means to govern the energization thereof. This control system includes a thermostat with a temperature sensing probe that is positioned in the oven cavity. The probe is supported by a support means having a plurality of spaced grounding points with the probe that renders the probe insensitive to the UHF energy so that the probe is not heated by the UHF energy nor will there be arcing between the support means and the probe or between the adjacent wall of the oven cavity and the combined support means and probe. This occurs because the spacing between grounding points is different than one-quarter of the wavelength of the electromagnetic energy or any odd multiple of one-quarter wavelength.

Our invention will be better understood from the following description taken in conjunction with the accompanying drawing and its scope will be pointed out in the appended claims.

FIGURE 1 is a left side elevational view of a free-standing electric range having an oven that is supplied with both ultra-high frequency energy and infrared energy for cooking food placed therein, with parts broken away to show the location of the thermostat probe for governing the energization of the infrared heating means according to the teachings of the present invention;

FIGURE 2 is an enlarged fragmentary view of a preferred embodiment of a support means for the temperature sensing probe of FIGURE 1;

FIGURE 3 is a top plan view of the support means for the temperature sensing probe taken on the line 3—3 of FIGURE 2;

FIGURE 4 is a transverse cross-sectional view of a grounding clip member connecting the capillary tube of the temperature sensing probe of FIGURE 2 with the support means;

FIGURE 5 is a modification of the support means of the temperature sensing probe showing a perforated tube for supporting the probe.

Turning now to a consideration of the drawing and in particular to FIGURE 1, there is shown one embodiment of this invention installed in a free-standing electric range 10 having a top cooking surface 11 with a plurality of surface heating elements 12, an oven cavity 13, a front opening oven door 14 and a backsplasher 15 that contains a control panel supporting the controlling components for both the surface heating units as well as the oven heating units. Specifically, an oven thermostat 16 is positioned in the backsplasher.

The oven cavity 13 is formed by the box-like oven liner 20 ond the oven door 14. The oven liner 20 has a bottom wall 21, opposite side walls 22, a top wall 23, and a back wall 24. The front wall of the oven liner 20 is open and it is provided with the oven door 14 for closing the oven. As is conventional in this art, a suitable layer of thermal insulating material such as fiberglass 25 is positioned around the outside of the oven liner to restrict the dissipation of heat from the oven to the range body for obtaining the highest efficiency in the utilization of the heat energy.

As mentioned previously, the oven cavity 13 is supplied with two medium of cooking energy; namely, ultra-high frequency electromagnetic wave energy generated by a magnetron tube and infrared energy provided by metal sheathed resistance elements. In other words, food may be cooked in this oven in one of three different ways. First, conventionally by using the infrared energy from the resistance heating elements. Second, by use of the UHF energy alone and thirdly, by a combination of the UHF and the infrared energy. The present invention does not relate to the two mediums of supplying cooking energy into the oven cavity for this is being claimed in a copending application of Louis H. Fitzmayer, Serial No. 135,582 entitled "Combination Electric and Electronic Oven," which was filed on September 1, 1961, and is assigned to the General Electric Company, the assignee of the present invention. However, a brief description of the various components of the UHF system will be described for disseminating a better understanding of the present invention.

Located beneath the oven cavity 13 is an apparatus compartment 28 within which is installed a magnetron tube assembly 29 which serves as a source of ultra-high frequency electromagnetic wave energy for the oven cavity 13. This magnetron is of conventional form and has for example an operating frequency in the band between 890 mc. and 950 mc. Also, a suitable power supply is located within the apparatus compartment 28 for exciting the magnetron at the desired frequency and R.F. power level. The electromagnetic wave energy from the magnetron 29 is guided to the oven cavity by way of a coaxial transmission line 31 which is built in three parts; namely, a first horizontal length 32 which extends horizontally from the tube 29 beneath the oven liner 20 and through a back panel 33 of the range body. Next, there is a vertical section 34 which extends up the back wall of the range, and finally there is a third horizontal section 35 which connects the upper end of the vertical section 34 with a feed box 36 that is located over an opening 37 in the top wall 23 of the oven liner. The feed box 36 is generally rectangular in plan view and it is seen in FIGURE 1 by its narrowest side. The feed box is positioned generally centrally of the oven cavity; that is, centrally between the back wall 24 and oven door 14 and also between the two side walls 22. Disposed over the opening 40 in the top wall 23 of the oven liner is a closure plate 41 of vitreous material that is transparent to the electromagnetic wave energy and serves to prevent grease and vapors that emanate from the food during cooking from entering the feed box and transmission line and interfering with the operation thereof.

At any single frequency of the electromagnetic wave energy, only one mode of oscillation can exist in the oven cavity. In other words, there can be only one distribution of regions of high electric field intensity and regions of high magnetic intensity. We plan to obtain uniform heating in the oven by providing a turntable 44 on which the food is to be supported so that all parts of the food are exposed to the wave energy in many different regions in the oven and the effects of the different field intensities are averaged out. The turntable has a vertical support shaft 45 which extends through the bottom wall 21 of the oven liner for connection with a motor driven gear train 46 which is designed to drive the turntable at a slow speed of about eight revolutions per minutes.

As in conventional electric ovens this oven is provided with resistance heating elements 48 and 49 located at the top and bottom of the oven cavity respectively. The top heating unit 48 is used for broiling operations and it is commonly referred to as the broil unit, while the lower heating unit 49 is used for baking operations and is commonly referred to as the bake unit. It is important to remove the broil unit 48 from direct interference with the waves radiating from the feed box opening 40. Hence, the broil unit is divided into two small looped units; namely, element 48 and element 48'. As is now standard in this art, these resistance elements are metal sheated units that have a central resistance wire in the form of a helix that is buried in an insulating material such as magnesium oxide, and a metal sheath surrounds the insulation to form the finished product.

Using the resistance heating elements, it is possible to obtain different degrees of temperature by providing within the power supply circuit for the heating elements a temperature control system in the form of a thermostat having a temperature sensing probe located within the oven cavity. While there are several types of temperature control systems in use today, the one most widely used is a hydraulic thermostat system of the general type taught in the Ettinger Patent 2,260,014, which is assigned to the General Electric Company the assignee of the present invention. In such a control system, the thermostat would be located at a remote point from the oven such as the thermostat 16 which was mentioned earlier as being positioned in the control panel of the backsplasher 15. Combined with the thermostat is a long capillary tube 50 as is best seen in FIGURE 2 which has formed at its free end an elongaed temperature sensing probe or bulb 51. A temperature responsive fluid fills both the bulb and capillary tube as well as a bellows or diaphragm (not shown) that is located within the thermostat housing. Temperature changes within the oven cavity affect the expansion and contraction of the fluid and this change is transmitted to the diaphragm for opening or closing a thermostat switch assembly that controls the energization of the resistance heating elements.

It is no problem to design a mechanical support for a thermostat bulb in a standard oven. However, when the bulb is located within an oven that is subject to radiations of electromagnetic wave energy it is necessary to design against the possibility of the wave energy loading into the bulb and causing the bulb to heat up which will either destroy its accuracy as a temperature sensing device or will set up an arcing condition between the bulb and its support or an adjacent wall of the oven liner and the combined bulb and support. Such arcing might seriously attack the sheath of the heating element and cause it to fail prematurely.

Looking at FIGURE 1, the thermostat bulb 51 is suspended from the top wall 23 of the oven liner adjacent the back wall and generally parallel to both walls so as to be parallel with a length of the back half 48' of the broil unit. A support member 53 holds the bulb in place to lie generally perpendicular with respect to the electromagnetic field as is best understood by referring to FIGURE 2 of the drawing which is an enlarged fragmentary view taken on the line 2—2 of FIGURE 1. The support member 53 is a wire or rod-like member that is connected in cantilever fashion to the upper wall 23 of the oven liner. For ease in installing and replacing the support member 53 it is attached to a mounting plate 55 as by welding and the plate is adapted to be fastened over an opening 56 in the top wall of the oven liner by a fastening screw 57. In order to simplify design by having only one fastening screw, the end of the support rod 53 is provided with a leaf spring portion 58 which serves as a tab or fingers that underlies one edge of the oven wall opening 56 as is best seen in FIGURE 2.

The support member 53 is substantially coextensive with both the bulb 51 and the portion of the capillary tube 50 which extends into the oven cavity. The support rod is formed with a grounding loop or hook at two spaced points such as near its end 60 and at an intermediate point 61. These loops are each provided with an open slot such as shown at 62 in FIGURE 1 so that the bulb enters the loop through the slot and is confined therein as is illustrated. Preferably, these slots in the loops are not arranged in the same plane but are offset from each other as is best seen in FIGURE 3 so as to give a better interlocking relationship between the bulb and the loops of the support rod.

The lengths of the support rod and thermostat bulb are such that no resonance will occur for either length over the operating frequency range of the UHF energy whether they are separately or jointly installed in the oven. For example, the horizontal dimension of the probe is equal to about three-fourths the wavelength $$\left(\frac{3\lambda}{4}\right)$$

the overhang from the free end of the support to the free end of the probe is about $\lambda/8$. This makes the horizontal distance from the innermost grounding loop 61 to the imaginary line along the portion of the capillary tube extending through the oven liner as about $\lambda/8$. Moreover, the bulb is spaced from the nearest oven liner wall by about $\lambda/8$. The length of the overhang may vary as much as $\lambda/4$ without any resonance effect over the designed operating frequency range of the oven. The bulb and bracket have sharp resonances at odd multiples of $\lambda/4$, i.e., $\lambda/4$, $3\lambda/4$, $5\lambda/4$ etc., where the bulb and support might act as a series resonant circuit causing large resonant surface currents to flow, thereby heating up the bulb and support excessively. Arcing might ensue due to the high voltage involved in resonant circuits.

Moreover, it is important to provide a grounding means, in addition to the grounding loops 60 and 61, between the capillary tube 50 and the support rod 53, and this is illustrated as a grounding clip 64 that is shown in both FIGURES 2 and 4 as being a spring member that closely overlies and holds the capillary tube 50 against the support rod 53. This grounding clip is of spring material so that it may easily be assembled over the two elements and held in place. The optimum location for this grounding clip is adjacent the attached end of the support rod as is illustrated. This grounding clip and the close spacing between the bulb and its support causes the assembly to act as a low impedance two wire transmission system. An additional precaution is taken to prevent electromagnetic pickup by the assembly by arranging the assembly perpendicularly to the electromagnetic field.

A second modification of a support means for the thermostat bulb 51 is illustrated in FIGURE 5 and is identified as element 66 which is again a cantilever member that is attached to a wall of the oven liner by means of the mounting plate 55 that is used for the support means 53 of the first modification. Element 66 is mainly a tubular member formed with a plurality of perforations 67 which reduce the thermal mass of the support and likewise expose the thermostat bulb to the radiant energy of the resistant heating elements. For ease in assembly, the curved portion 68 of the support member 66 has its lower side cut-away so that the resulting cross-section is a channel shape that is open downwardly. Accordingly, the thermostat bulb 51 and its capillary tube 50 may be drawn through the opening 56 in the top wall of the oven liner and then the bulb can be inserted into the left side of the perforated tube and drawn therein until the bulb is completely shielded by the tube. The bulb will rest on the bottom portion of the tube and engage the tube at a plurality of grounding points. Hence, the combination serves as a low impedance eccentric transmission line and renders the bulb insensitive to the ultra-high frequency electromagnetic wave energy. The length of the perforated tube is a critical dimension so as to prevent the resonance of the tube over the operating frequency band of the radio frequency energy.

Modifications of this invention will occur to those skilled in this art, therefore, it is to be understood that this invention is not limited to the particular embodiments disclosed but that it is intended to cover all modifications which are within the true spirit and scope of this invention as claimed.

What we claim as new and desire to secure by Letters Patent of the United States is:

1. A cooking apparatus comprising walls forming an oven cavity, one wall of the cavity including a door for gaining access therethrough, generating means for radiating a field of ultra-high frequency electromagnetic wave energy throughout the oven cavity, heating means for radiating infrared energy throughout the enclosure, and a temperature control system for the infrared heating means comprising a hydraulic thermostat with a capillary tube connecting the thermostat to an elongated bulb positioned within the oven cavity adjacent said heating means, and support means for rendering the thermostat bulb insensitive to the field of the ultra-high frequency energy, said support means being a metallic member of low thermal mass that is of cantilever construction that lies perpendicularly with respect to the field of the electromagnetic wave energy, one end of the support means being attached to one wall of the oven cavity, the capillary tube entering the oven cavity through an opening adjacent the attached end of the support means, the support means being of elongated shape that is substantially coextensive with and engages the thermostat bulb at a plurality of spaced grounding points to prevent arcing between these elements and the adjacent wall of the oven cavity and these elements, the spacing between grounding points being different than one-quarter of the wavelength of the electromagnetic wave energy or any odd multiple of one-quarter wavelength.

2. A cooking apparatus comprising walls forming an oven cavity, one wall of the cavity including a door for gaining access thereto, generating means for producing a field of ultra-high frequency electromagnetic wave energy, and transmission means joined between the generating means and the oven cavity for radiating the ultra-high frequency energy throughout the cavity, resistance heating means positioned within the oven cavity for radiating infrared energy throughout the cavity, and a hydraulic thermostatic control system for governing the energization of the resistance heating means, said control system comprising a hydraulic thermostat with a capillary tube connecting the thermostat to an elongated bulb positioned within the oven cavity adjacent the resistance heating means, and a support means for the bulb to render the bulb insensitive to the ultra-high frequency energy, said support means being attached to a wall of the oven cavity and being substantially coextensive with the bulb and the portion of the capillary tube within the cavity, said support means including a plurality of spaced grounding points with respect to the combination bulb and tube, said grounding points being spaced apart a distance other than one-quarter of the wavelength of the electromagnetic wave energy or any odd multiple of one-quarter wavelength so as to prevent the bulb from forming a resonant circuit with respect to the support and being heated by the ultra-high frequency energy to give a false temperature reading.

3. A cooking apparatus comprising walls forming an oven cavity, one wall of the cavity including a door for gaining access thereto, a UHF energy generator having guiding and feeding means for radiating a field of UHF energy within the cavity, resistance heating means positioned within the cavity, and a thermostatic control system for the resistance heating means comprising a hydraulic thermostat with a capillary tube joining a thermostat to an elongated temperature sensing bulb positioned within the oven cavity adjacent the heating means, and a metallic support means for rendering the thermostat bulb insensitive to the UHF energy, said support means being an elongated member having at least one end attached to a wall of the oven cavity the said wall also having an opening adjacent the attachment of the support means for receiving the capillary tube therethrough, the bulb and portion of the tube within the cavity being substantially coextensive with the support means, and a grounding clip firmly gripping the tube to the support means in the vicinity of the said openings.

4. A combined UHF and infrared cooking apparatus comprising walls forming an oven cavity, one wall of the cavity including a door for gaining access thereto, a UHF energy generator having a transmission and seating means for coupling the UHF energy with the cavity, resistance heating means positioned within the cavity, and a thermostatic control system for governing the energization of the resistance heating means, said control system comprising a thermostat provided with an elongated temperature sensing probe positioned within the cavity adjacent the resistance heating means, and a metallic support means for shielding the sensing probe and rendering the probe insensitive to the UHF energy, said support means being a metallic tube which is attached to the wall of the oven cavity and encompasses the sensing probe that is seated therein on a plurality of spaced grounding points to serve as a low impedance coaxial transmission line, the support tube being of low thermal mass so as to expose the sensing probe to the infrared energy of the resistance heating means.

5. A cooking apparatus as recited in claim 4 where the support tube is substantially covered with openings therethrough.

6. A combined UHF infrared cooking oven comprising walls forming an oven cavity, one wall of the oven including a door for gaining access thereto, a UHF energy generator combined with a transmission and feeding means for guiding the wave energy and coupling the energy to the oven and for radiating the energy throughout the cavity, resistance heating means for radiating infrared energy throughout the cavity, and a thermostatic control system for governing the energization of the resistance heating means, said control system comprising a thermostat provided with a remote temperature sensing probe positioned within the oven cavity, and a support means for the sensing probe to render the probe insensitive to the UHF energy, said support means being a thin metal rod of elongated shape that is attached at one end to a wall of the oven, and opening through said oven wall adjacent the attached end of the metal rod for receiving the sensing probe into the oven cavity, the rod being substantially coextensive with the probe and having a limited number of widely spaced support loops encompassing the probe, and a grounding clip firmly connecting the probe to the support rod adjacent the said wall openings to prevent arcing between the rod and the probe and between the adjacent oven wall and the combined rod and probe.

7. A cooking apparatus comprising walls forming an oven cavity, one wall of the cavity including a door for gaining access thereto, a UHF energy generator having guiding and feeding means for radiating a field of UHF energy within the cavity, resistance heating means positioned within the cavity, and a thermostatic control system for the resistance heating means comprising a hydraulic thermostat with a capillary tube joining a thermostat to an elongated temperature sensing bulb positioned within the oven cavity adjacent the heating means, and a metallic support means for rendering the thermostat bulb insensitive to the UHF energy, said support means being an elongated member having at least one end attached to a wall of the oven cavity, the said wall also having an opening adjacent the attachment of the support means for receiving the capillary tube therethrough, the bulb and portion of the tube within the cavity being substantially coextensive with the support means and lying generally perpendicular to the field of the UHF energy, the support means including a plurality of spaced grounding connections engaging the bulb, said spacing between connections being different than one-quarter of the wavelength of the UHF energy or any odd multiple of one-quarter wavelength.

References Cited by the Examiner
UNITED STATES PATENTS 2,744,990  5/56  Schroeder _____ 219—10.55
3,081,392  3/63  Warner _____ 219—10.55

RICHARD M. WOOD, *Primary Examiner.*